United States Patent
Eisenhour

(10) Patent No.: US 7,363,766 B2
(45) Date of Patent: Apr. 29, 2008

(54) VEHICLE AIR CONDITIONING SYSTEM

(75) Inventor: Ronald Eisenhour, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 315 days.

(21) Appl. No.: 11/268,533

(22) Filed: Nov. 8, 2005

(65) Prior Publication Data
US 2007/0101747 A1    May 10, 2007

(51) Int. Cl.
*F25B 21/02* (2006.01)
(52) U.S. Cl. .......................... 62/3.61; 62/513
(58) Field of Classification Search ............ 62/3.2–3.7, 62/513
See application file for complete search history.

(56) References Cited

U.S. PATENT DOCUMENTS

| | | | |
|---|---|---|---|
| 3,956,902 A | 5/1976 | Fields, Jr. | |
| 4,194,536 A | 3/1980 | Stine et al. | |
| 4,355,518 A * | 10/1982 | Beitner | 62/3.61 |
| 4,476,685 A | 10/1984 | Aid | |
| 5,524,439 A * | 6/1996 | Gallup et al. | 62/3.5 |
| 5,687,573 A | 11/1997 | Shih | |
| 5,901,572 A | 5/1999 | Peiffer et al. | |
| 6,158,225 A | 12/2000 | Muto et al. | |
| 6,351,950 B1 * | 3/2002 | Duncan | 62/3.2 |
| 6,434,972 B1 | 8/2002 | Geiger et al. | |
| 6,467,300 B1 | 10/2002 | Noble | |
| 6,915,646 B2 | 7/2005 | Kadle et al. | |
| 7,240,494 B2 * | 7/2007 | Akei et al. | 62/3.2 |

OTHER PUBLICATIONS

Michael Bernstein; More efficient and reliable refrigerators and air conditioners a step closer to reality; Article from Science Blog.; Mar. 2003.

Melcor Corporation; Melcor Thermal Solutions Catalog, p. 1-25; Trenton, NJ, U.S.A.; prior to Nov. 8, 2005.

* cited by examiner

*Primary Examiner*—William E Tapolcai
(74) *Attorney, Agent, or Firm*—Global IP Counselors, LLP

(57) ABSTRACT

A vehicle air conditioning system includes a compressor, a condenser, an evaporator and a thermoelectric device. The compressor is configured to receive a refrigerant and compress the refrigerant to a compressed state. The condenser is in fluid communication with the compressor to receive the refrigerant in the compressed state via a high pressure tube. The evaporator is in fluid communication between the condenser and the compressor to receive the refrigerant from the condenser and convey the refrigerant to the compressor via a low pressure tube. The thermoelectric device is operatively arranged relative to at least a portion of the high pressure tube to remove heat from the high pressure tube.

15 Claims, 9 Drawing Sheets

VEHICLE AIR CONDITIONING SYSTEM

BACKGROUND OF THE INVENTION

1. Field of the Invention

The present invention generally relates to a vehicle air conditioning system. More specifically, the present invention relates to a vehicle air conditioning system provided with intercooling to a high pressure portion.

2. Background Information

A typical vehicle air conditioning system includes a compressor, a condenser, an expansion valve or orifice tube, and an evaporator. The compressor compresses a cool vapor-phase refrigerant (e.g., Freon, R134a) to heat the same, resulting in a hot, high-pressure vapor-phase refrigerant. This hot vapor-phase refrigerant runs through a condenser, typically a coil that dissipates heat. The condenser condenses the hot vapor-phase refrigerant into liquid refrigerant. The liquid refrigerant is throttled through an expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

In order to improve the efficiency of such vehicle air conditioning systems without sacrificing fuel economy, intercooling has been added enabling the transfer of heat from a high refrigerant tube downstream from the condenser to a low refrigerant pressure tube downstream from the evaporator. Such transfer of heat improves the efficiency of the vehicle air conditioning system. However, in peak load conditions, such as extremely high ambient temperature conditions, the effectiveness of the vehicle air conditioning system can sometimes be insufficient to adequately cool the passenger compartment of the vehicle even with such intercooling.

In view of the above, it will be apparent to those skilled in the art from this disclosure that there exists a need for an improved air conditioning system that increases the cooling capacity of the vehicle air conditioning system. This invention addresses this need in the art as well as other needs, which will become apparent to those skilled in the art from this disclosure.

SUMMARY OF THE INVENTION

It has been discovered that adding intercooling to an air conditioning system can increase the cooling capacity of the system.

One object of the present invention is to provide an air conditioning system that improves the effectiveness of intercooling.

Another object of the present invention is to provide an air conditioning system that has increased the cooling capacity without costly modification to the vehicle air conditioning system.

In accordance with one aspect of the present invention, a vehicle air conditioning system is provided with a compressor, a condenser, an evaporator and a thermoelectric device. The compressor is configured to receive a refrigerant and compress the refrigerant to a compressed state. The condenser is in fluid communication with the compressor to receive the refrigerant in the compressed state via a high pressure tube. The evaporator is in fluid communication between the condenser and the compressor to receive the refrigerant from the condenser and convey the refrigerant to the compressor via a low pressure tube. The thermoelectric device is operatively arranged relative to at least a portion of the high pressure tube to remove heat from the high pressure tube.

In another aspect of the present invention, the thermoelectric device further contacts a heat sink for dissipation of heat thereto. The heat sink can be any of a variety of elements of the vehicle or the vehicle air conditioning system. For example, the heat sink can be at least a portion of the low pressure tube, a portion of a vehicle body member, or a heat dissipation member having cooling fins.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
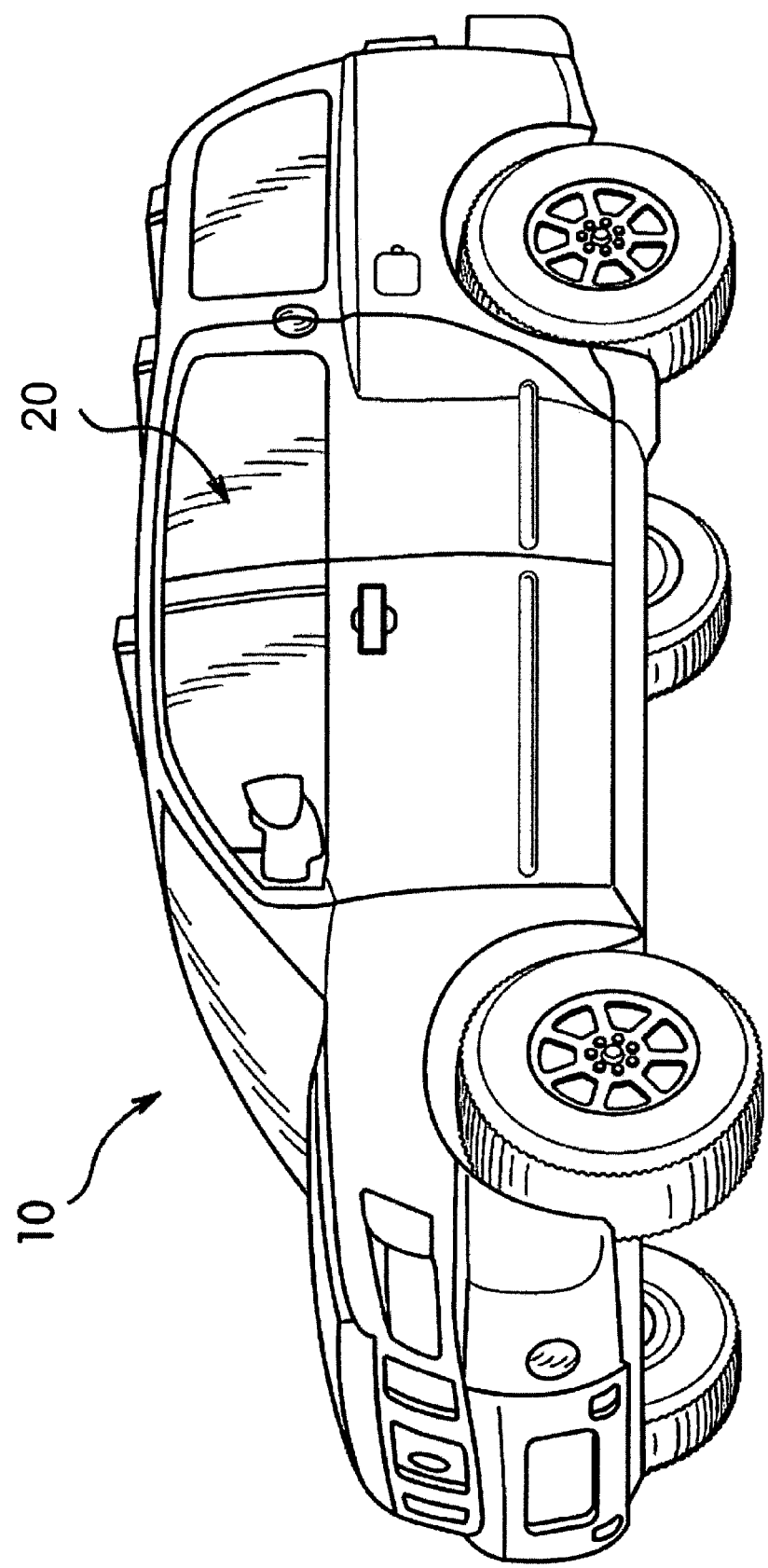
FIG. 1 is a side perspective view of a vehicle that is equipped with a vehicle air conditioning system in accordance with the present invention.
Figure 2:
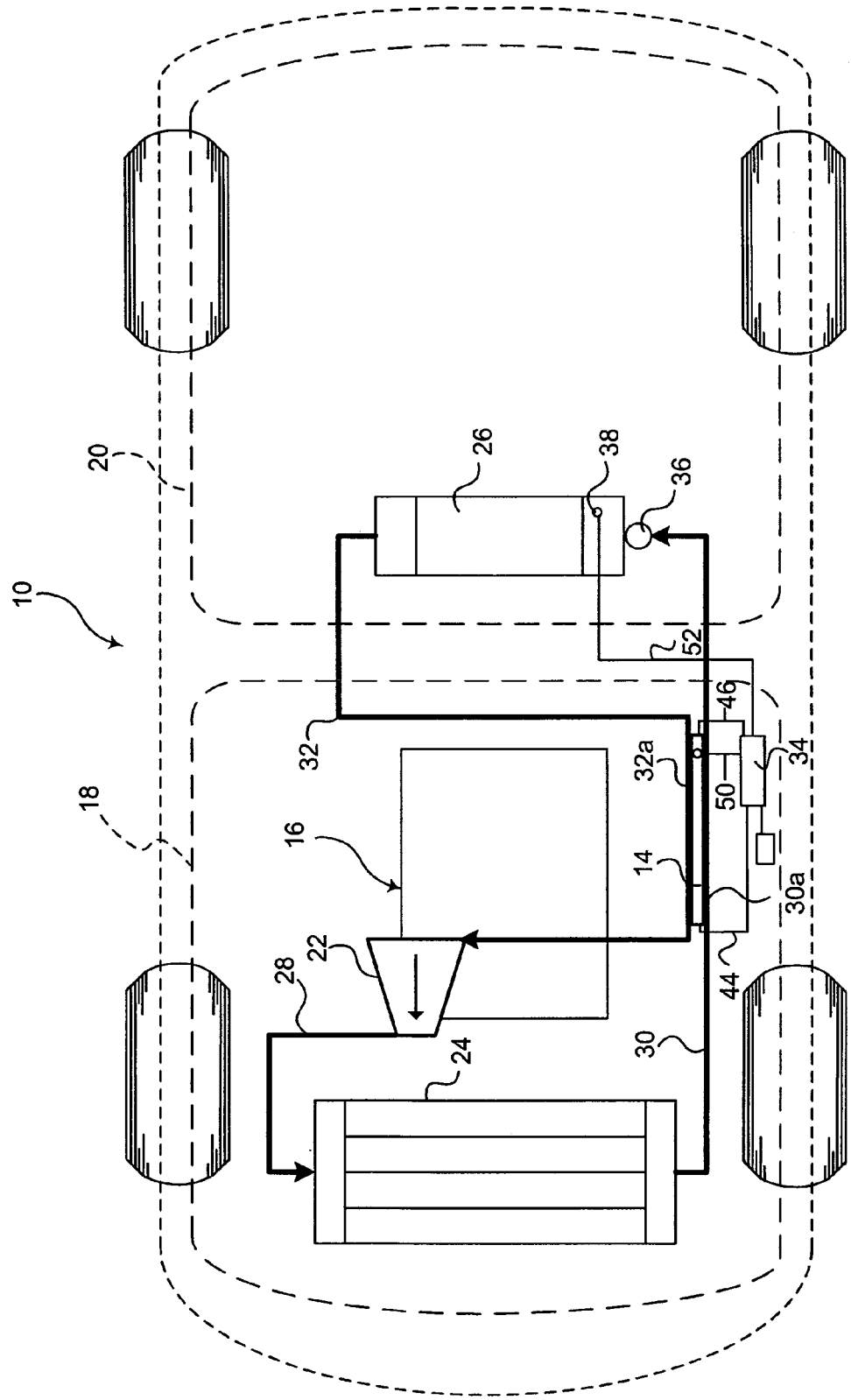
FIG. 2 is a simplified, schematic top plan view of the vehicle showing the vehicle air conditioning system with a thermoelectric device that provides intercooling in accordance with a first embodiment of the present invention.

Referring initially to FIGS. 1 and 2, a vehicle 10 is illustrated that includes a vehicle air conditioning system 12 having a thermoelectric device 14 (FIG. 2) that provides enhanced intercooling to a high pressure side of the vehicle air conditioning system 12 in accordance with a first embodiment of the present invention. As shown in FIG. 2, the vehicle 10 includes among other things, an engine 16 located in an engine compartment 18 and a passenger compartment or vehicle cabin 20.

The vehicle air conditioning system 12 serves to cool (remove heat) from the passenger compartment or vehicle cabin 20. The thermoelectric device 14 is operably connected to the high pressure side of the vehicle air conditioning system 12 in order to increase cooling capacity, in particular during peak load periods. For example, in extremely hot weather or peak load conditions, use of the thermoelectric device 14 can increase or improve the cooling capacity of the vehicle air conditioning system 12.

Figure 3:
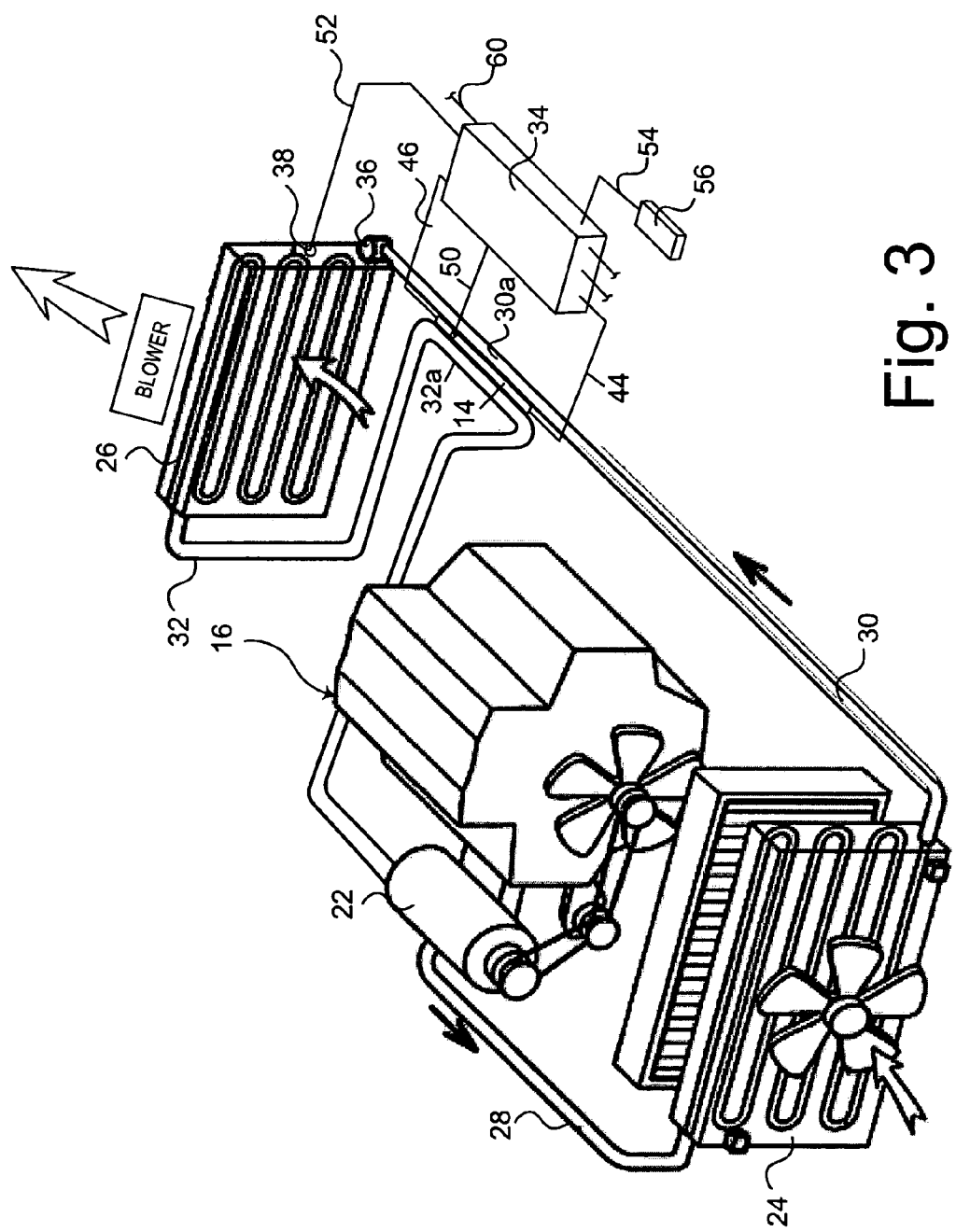
FIG. 3 is a simplified, schematic perspective view of selected portions of the vehicle air conditioning system in accordance with the first embodiment of the present invention.

As shown in FIGS. 2 and 3, the vehicle air conditioning system 12 basically includes a compressor 22, a condenser 24, an evaporator 26, a first high pressure tube 28, a second high pressure tube 30, a low pressure tube 32, the thermoelectric device 14 (mentioned above) and a controller 34. The vehicle air conditioning system 12 is illustrated only with the very basic components of a refrigerant circuit. However, it should be understood by those skilled in the art that the vehicle air conditioning system 12 of the present invention can be any of a variety of more complex air conditioning systems, such as systems with dual or multiple evaporators and/or dual or multiple compressors with various modifications to, for example, improve efficiency and/or cooling capacity. Moreover, these air conditioning basic components 22, 24 and 26 are conventional components that are well known in the air conditioning field. Since these air conditioning basic components 22, 24 and 26 are well known in the air conditioning field, the structures of these air conditioning basic components 22, 24 and 26 will not be discussed or illustrated in detail herein.

The compressor 22 and the condenser 24 are located within the engine compartment 18, while the evaporator 26 is located within the passenger compartment or vehicle cabin 20. The compressor 22 is preferably powered by the engine 16, but alternatively can be powered by an alternative power source such as an electric motor or other rotary power providing apparatus. The compressor 22 is fluidly connected to the condenser 24 via the first high pressure tube 28. The condenser 24 is fluidly connected to the evaporator 26 via the second high pressure tube 30. Preferably, the second high pressure tube 30 includes an expansion valve 36. The evaporator 26 is also fluidly connected to the compressor 22 via the low pressure tube 32. Thus, a refrigerant (e.g., Freon, R134a) is circulated through the refrigerant circuit of the air conditioner 10 to cool the passenger compartment or vehicle cabin 20.

In particular, the compressor 22 receives and compresses a cool vapor-phase refrigerant from the evaporator 26. In other words, the compressor 22 is configured to receive a refrigerant and compress the refrigerant to a compressed state. The compression action heats the refrigerant, resulting in a hot, high-pressure vapor-phase refrigerant. This hot vapor-phase (compressed) refrigerant is then fed to the condenser 24 through the first high pressure tube 28, such as an air-cooled coil that dissipates heat. The condenser 24 condenses the hot vapor-phase refrigerant into a liquid-phase refrigerant or a saturated liquid-vapor-phase refrigerant. In the preferred embodiment of the present invention, the condenser 24 condenses the refrigerant by air cooling. Thus, the condenser 24 of the preferred embodiment is a heat removal device. The condensed refrigerant is then delivered to the expansion valve 36 on the evaporator 26 via the second high pressure tube 30. Specifically, the second high pressure tube 30 extends from the condenser 24 in the engine compartment 18 and into the vehicle cabin 20 where it is connected to the expansion valve 36 on the evaporator 26. Thus, the second high pressure tube 30 feeds condensed refrigerant from the condenser 24 to the evaporator 26. The condensed refrigerant passes through the expansion valve 36, which expands the liquid-phase or saturated liquid-vapor-phase refrigerant to a cold, low-pressure liquid-vapor-phase refrigerant having a higher vapor content. Thus, the high pressure refrigerant passes through the expansion valve 36 so as to be throttled to a low pressure and temperature. The cold liquid-vapor-phase refrigerant (having a higher vapor content than the refrigerant exiting the condenser) runs through the evaporator 26, typically a coil that absorbs heat from and cools the air delivered to the passenger compartment or vehicle cabin 20. The low pressure tube 32 extends between the vehicle cabin 20 and the engine compartment 18 to fluidly connect the evaporator 26 to the compressor 22. Specifically, the low pressure tube 32 feeds the expanded refrigerant at a low pressure from the evaporator 26 back to the compressor 22. Thus, with the vehicle air conditioning system 12 operating, the expanded refrigerant enters the compressor 22 via the low pressure tube 32. At this point, the refrigerant is preferably in the form of a vapor that is compressed by the compressor 22. When the refrigerant exits the compressor 22 into the first high pressure tube 28, the refrigerant is preferably a compressed liquid that is fed to the condenser 24 as mentioned above.

As mentioned above, the evaporator 26 includes an expansion valve 36. The expansion valve 36 restricts the flow of the refrigerant entering the evaporator 26 from the second high pressure tube 30. Specifically, as refrigerant enters the evaporator 26 from the second high pressure tube 30 the expansion valve 36 restricts flow of the refrigerant causing the refrigerant to expand or evaporate into a gaseous form in the evaporator 26. It should be understood that the expansion valve 36 can be an internal component of the evaporator 26 or can be a separate elements upstream of the evaporator 26 located along the refrigerant path defined by the second high pressure tube 30. The evaporator 26 also optionally includes an evaporator temperature sensor 38.

The operations of the air conditioner 12 are controlled by a set of operator controls (not shown) that are located in the vehicle cabin 20. The operator controls typically will include an ON/OFF switch, a temperature control and a blower of fan speed control. Once the operator turns on the air conditioner 12, a control signal is received by a controller 34 which can be a part of an vehicle computer or engine control unit ECU. In other words, the computer controller 24 operates the air conditioner 10 in accordance with the settings of the operator controls.

As indicated in both FIGS. 2 and 3, the second high pressure tube 30 and the low pressure tube 32 are formed such that a portion 30a of the second high pressure tube 30 extends along a portion 32a of the low pressure tube 32 with the thermoelectric device 14 extending therebetween. Referring to the enlarged views in FIGS. 4 and 5, the portion 30a of the second high pressure tube 30, the thermoelectric device 14 and the portion 32a of the low pressure tube 32 are shown in greater detail.

The thermoelectric device 14 is preferably a conventional solid state device that responds to electric current by absorbing heat on one side thereof and expelling the heat on another side thereof. Basically, the thermoelectric device 14 is formed with a heat absorbing side 40, a heat dissipating side 42, a first power lead 44, a second power lead 46 and a temperature sensor 48. With current applied to the first and second power leads 42 and 44, the thermoelectric device 14 takes heat at the heat absorbing side 40 and moves that heat at the heat dissipating side 42.

The thermoelectric device 14 can be a specially constructed device or can be a conventional off-the-shelf thermoelectric module, such as those manufactured and marketed by, for example, MELCOR CORPORATION in Trenton, N.J. Such thermoelectric devices exhibit what is referred to as the "Peltier effect", where heat on a heat absorbing side of the device is drawn to a heat dissipating side of the device in response to electric current passing therethrough. Conventional thermoelectric devices, such as the thermoelectric device 14, are preferably constructed of two ceramic substrates (not shown) that serve as a housing and electrical insulation for P-type and N-type elements (not shown) between the substrates. In response to electrical current, heat is absorbed by electrons as they pass from a low energy level in the P-type element to a higher energy level in the N-type element. Conventional thermoelectric devices typically include several P-type and N-type elements that are electrically connected in series but are thermally arranged in parallel for transference of heat. Since thermoelectric devices are generally known and are available as off-the-shelf components, further description of the internal configuration of the thermoelectric device 14 of the present invention is omitted for the sake of brevity.

Figure 4:
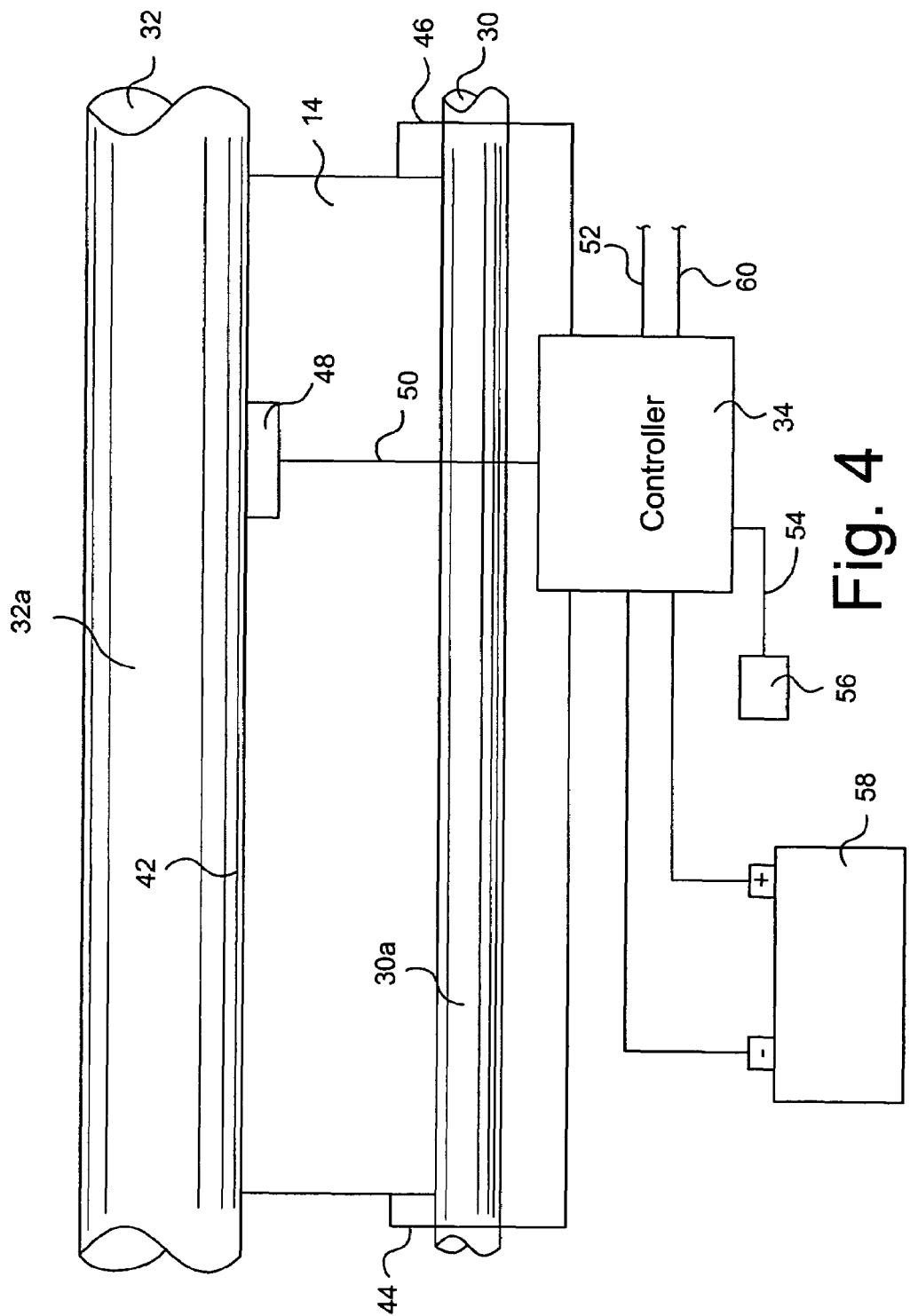
FIG. 4 is an enlarged schematic top plan view of a portion of the vehicle air conditioning system showing the thermoelectric device installed between a high pressure line and a low pressure line with a controller electrically connected to the thermoelectric device in accordance with the first embodiment of the present invention.
Figure 5:
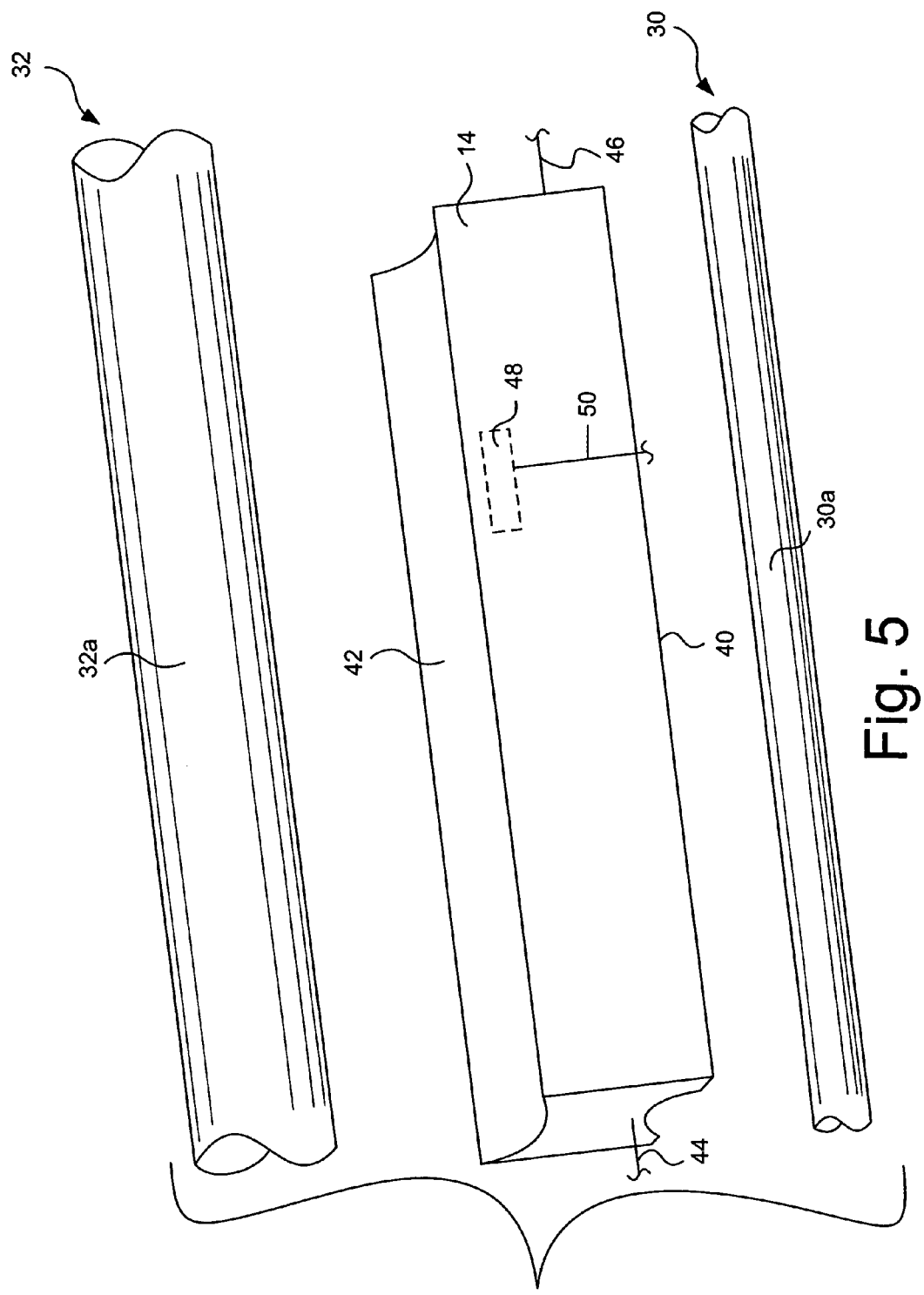
FIG. 5 is an enlarged, exploded perspective view of the portion of the vehicle air conditioning system depicted in FIG. 4 showing further details of the thermoelectric device, the high pressure line and the low pressure line in accordance with the first embodiment of the present invention.

A heat sink is preferably in heat conducting contact or connected to the heat dissipating side 42 of the thermoelectric device 14 for dissipation of the transported heat. In the first embodiment of the present invention, the heat sink is formed by a portion of the low pressure tube 32, as shown in FIGS. 4 and 5 and described in greater detail below.

The thermoelectric device 14 can be formed in any of a variety of shapes. For example, in the depicted embodiment shown in FIGS. 4 and 5, the portion 30a of the high pressure tube 30 and the portion 32a of the low pressure tube 32 are cylindrical in shape. Therefore, the thermoelectric device 14 can be formed with arcuate or curved surfaces to maximize contact and heat transference from the high pressure tube 30 to the low pressure tube 32. Alternatively, the high pressure tube 30 and the low pressure tube 32 can be flattened into a more rectangular shape with the thermoelectric device 14 having a similar shape to maximize contacting surfaces and heat transference capabilities.

Therefore, it should be understood from the description herein and the drawings that the specific shape and dimensions of the thermoelectric device 14, the high pressure tube 30 and the low pressure tube 32 is not limited to the cylindrical or curved shapes depicted. Rather, the specific shapes and dimensions of the thermoelectric device 14, the portion 30a of the high pressure tube 30 and the portion 32a of the low pressure tube 32 are a design consideration that depends upon the load requirements of the vehicle air conditioning system 12 and other engineering considerations. Specifically, the present invention is not limited to shapes and relative dimensions of the elements depicted schematically in the drawings. Preferably, the heat absorbing side 40 of the thermoelectric device 14 is in heat conducting contact with or directly contacting the portion 30a of the high pressure tube 30.

As mentioned above, the heat sink in the first embodiment of the present invention is the portion 32a of the low pressure tube 32. Thus, in the first embodiment of the present invention, the heat dissipating side 42 of the thermoelectric device 14 is fixed to or otherwise held in heat conducting contact with the portion 32a of the low pressure tube 32 in order to maximize heat transference potential therebetween.

With electrical current to the first and second first power leads 44 and 46, the thermoelectric device 14 draws heat from the heat absorbing side 40 and moves that heat to the heat dissipating side 42 using the Peltier effect. It should be understood that without electrical current being applied to the first and second first power leads 44 and 46 of the thermoelectric device 14 can serve as a heat conductor with heat moving from the second high pressure tube 30 to the low pressure tube 32 (the heat sink). However, with electric current applied the first and second first power leads 44 and 46 of the thermoelectric device 14, the movement of heat is increased such that the cooling capacity of the vehicle air conditioning system 12 is improved to an extent greater than without activation of the thermoelectric device 14.

The thermoelectric device 14 also preferably includes a temperature sensor 48. The temperature sensor 48 is an optional feature of the thermoelectric device 14. The temperature sensor 48 includes a lead 50 that connects to the controller 34, as described in greater detail below.

With the vehicle air conditioning system 12 operating and electric current supplied to the thermoelectric device 14, the thermoelectric device 14 draws heat from the high temperature refrigerant in the portion 30a of the second high pressure tube 30 and moves it to the portion 32a of the low pressure tube 32 where it is absorbed by the lower temperature refrigerant in the low pressure tube 32. The refrigerant in the low pressure tube 32 has already been passed through the evaporator 26. Pulling heat from the second high pressure tube 30 prior to entering the evaporator 26 increases the cooling capacity of the vehicle air conditioning system 12, in particular, during extreme load conditions where the vehicle cabin 20 is hot.

In one embodiment of the present invention, the thermoelectric device 14 can be selectively engaged, since operation of the thermoelectric device 14 is most desirable at peak cooling capacity circumstances. The thermoelectric device 14 can be turned off during low cooling capacity circumstances when it is not needed. Hence, the thermoelectric device 14 can be controlled using the controller 34.

As shown in FIGS. 2, 3 and 4, the controller 34 is connected to the first power lead 44 and the second power lead 46 of the thermoelectric device 14 for selectively turning the thermoelectric 14 device on and off. The controller 34 is also connected to the lead 50 of the temperature sensor 48, a lead 52 connected to the temperature sensor 38 at the evaporator 26 (FIGS. 3 and 4), a lead 54 connected to an ambient temperature sensor 56 (FIGS. 3 and 4), a battery 58 (FIG. 4) of the vehicle 10 and a lead 60 (FIGS. 3 and 4) that is connected to the controls of the vehicle air conditioning system 12.

A more detailed description of the various lead wires and associated sensors is now provided. The first power lead 44 and the second power lead 46 of the thermoelectric device 14 are configured to receive electrical power from a power source, such as the battery 58. Power from the battery 58 is selectively supplied via a switch (not shown) within the controller 34. The temperature sensor 48 is embedded in or on the thermoelectric device 14 for detecting the temperature thereof. The lead 50 connects the temperature sensor 48 to the controller 34 providing the measured temperature reading thereto. The temperature sensor 38 at the evaporator 26 can be configured and positioned to measure any of a variety of temperatures, depending upon engineering considerations of the vehicle air conditioning system 14. For example, the temperature sensor 38 can be positioned to measure any one of the following: the temperature of the refrigerant within the evaporator 26, the temperature of the outer surface of the evaporator 26, the temperature of the air flowing out of the evaporator 26, the temperature of the air flowing into the evaporator 26 or the ambient temperature within the vehicle cabin 20. The lead 52 connects the temperature sensor 38 to the controller 34 providing the measured temperature reading thereto. The ambient temperature sensor 56 (FIGS. 3 and 4) can be located at any appropriate location on the vehicle 10 for measurement of the air temperature outside the vehicle 10. The lead 54 is connected to the controller 34 providing the measured temperature reading thereto. Last, the lead 60 (FIGS. 3 and 4) connects the controller 34 with either the controls (not shown) of the vehicle air conditioning system 12 or a clutch (not shown) on the compressor 22. Accordingly, the controller 34 is provided with a signal indicating the operating status of the vehicle air conditioning system 12.

The controller 34 can be configured in a variety of ways in order to operate the thermoelectric device 14. For example, the controller 34 can detect the ambient temperature (temperature outside the vehicle 10) via the ambient temperature sensor 56. With the vehicle air conditioning system 12 operating, if the ambient temperature at the ambient temperature sensor 56 is above a predetermined threshold temperature $T_A$ then the controller 34 turns the thermoelectric device 14 on. The threshold temperature $T_A$ is predetermined based upon any of a variety of combination of factors. For example, such factors can include the size of the vehicle 10, the cooling capacity of the vehicle air conditioning system 12, the size of the engine 16, the climate the vehicle 10 is designed to operate in, whether or not the vehicle 10 is an economy car or a luxury car, and other engineering conditions. Therefore, the threshold temperature $T_A$ is not a fixed temperature for purposes of describing the present invention, but rather is a design consideration for the particular application of the vehicle air conditioning system 12.

Alternatively, the controller 34 can detect the temperature at the evaporator temperature sensor 38 at the evaporator 26. With the vehicle air conditioning system 12 operating, if the temperature at the evaporator temperature sensor 38 is above a predetermined threshold temperature $T_E$ then the controller 34 turns the thermoelectric device 14 on. Like the threshold temperature $T_A$, the threshold temperature $T_E$ is not a fixed temperature for purposes of describing the present invention, but rather is a design consideration for the particular application of the vehicle air conditioning system 12.

Specifically, the controller 34 turns the thermoelectric device 14 on in response to conditions where maximum cooling capacity is needed from the vehicle air conditioning system 12. It should be understood from the drawings and the disclosure herein that the controller 34 can use the temperature reading from either or both of the sensors 38 and 56, depending upon the requirements of the vehicle 10 and the cooling demands placed upon the vehicle air conditioning system 12. For example, in some vehicle applications, the controller 34 can be connected only to the evaporator temperature sensor 38 for control of the thermoelectric device 14. In other vehicle applications, the controller 34 can be connected only to the ambient temperature sensor 56 for control of the thermoelectric device 14. In still other vehicle designs and applications, the controller 34 can be connected to both the evaporator temperature sensor 38 and the ambient temperature sensor 56 for control of the thermoelectric device 14. In other words, the controller 34 is connected to the evaporator temperature sensor 38 that senses temperature of the evaporator 26, turning the thermoelectric device 14 on in response to detection of the evaporator 26 operating above the threshold temperature $T_E$ when the vehicle air conditioning system 12 operates. Alternatively, the controller 34 is connected to the temperature sensor 56 that detects ambient temperatures outside the vehicle 10, the controller turning the thermoelectric device 14 on in response to detection of the ambient temperature exceeding the threshold temperature $T_A$ when the vehicle air conditioning system 12 operates.

The controller 34 can optionally be connected to the temperature sensor 48 that detects temperature of the thermoelectric device 14. Hence, the controller 34 can turn the thermoelectric device 14 off in response to detection of the thermoelectric device 14 exceeding a threshold temperature $T_T$ when the vehicle air conditioning system 12 operates. The threshold temperature $T_T$ is a critical temperature where at temperatures above the threshold temperature $T_T$ the thermoelectric device 14 can be damaged. It should be understood from the description herein that the temperature sensor 48 is an optional element and is not required for use of the vehicle air conditioning system 12 of the present invention. Rather, there can be applications where the vehicle air conditioning system 12 is used in extreme heat conditions where temperatures in the thermoelectric device 14 can reach levels that can damage it. Therefore, for extreme conditions, use of the temperatures sensor 48 in the thermoelectric device 14 can be advantageous, but is not required for all possible applications of the thermoelectric device 14.

Figure 6:
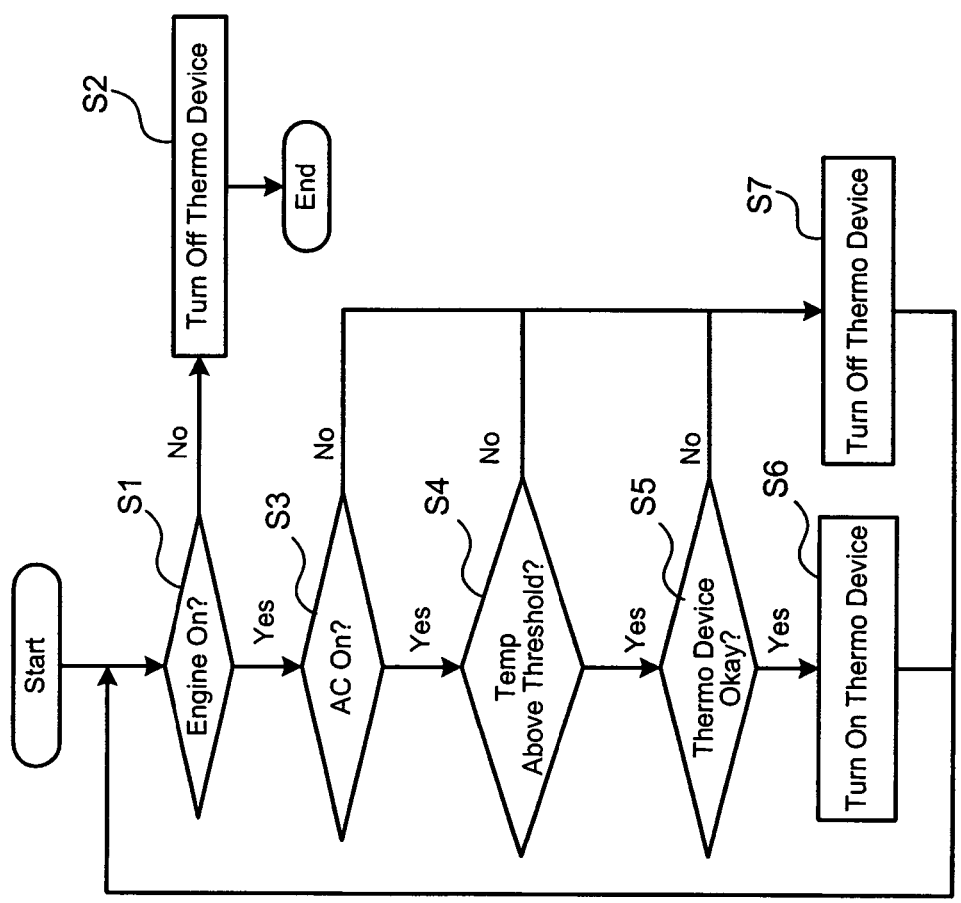
FIG. 6 is a flowchart showing a routine executed by the controller for operating the thermoelectric device in accordance with the first embodiment of the present invention.

With specific reference now to FIG. 6, the operational steps of the controller 34 are now described. At the beginning of the control routine, the operation starts with the introduction of power within the vehicle 10, for example by turning the ignition key to the on position. The controller 34 proceeds to step S1 where the controller 34 determines if the engine 16 has been started, i.e., turned on. If the engine 16 is off, then the control routine proceeds to step S2. In step S2, the controller 34 turns off the thermoelectric device 14 if it is on and the control routine ends. However, if the engine 16 is determined by the controller 34 in step S1 to be on, then the control routine proceeds to step S3.

In step S3, the controller 34 checks via the lead 60 to see if the vehicle air conditioning system 12 has been turned on. If the vehicle air conditioning system 12 has been turned on, then the control routine proceeds to step S4.

In step S4 the controller 34 checks the temperature at least one of the sensors 38 or 56. If the detected temperature is above the corresponding threshold temperature(s) ($T_E$ or $T_A$), then the control routine proceeds to step S5.

In step S5 the controller 34 checks the status of the thermoelectric device 14, for instance by checking the temperature detected by the sensor 48. If the thermoelectric device 14 is within the prescribed temperature range, then the control routine proceeds to step S6.

In step S6 the thermoelectric device 14 is turned on by the controller 34. If in step S3 the vehicle air conditioning system 12 is off, then the control routine proceeds to step S7 and the thermoelectric device 14 is turned off if it is on and if off, remains off.

If in step S4 the temperature sensor 38 or 56 is below the respective threshold temperature, then the control routine proceeds to step S7 and the thermoelectric device 14 is turned off. If in step S5 the controller 34 determines that the thermoelectric device 14 is not within prescribed operating temperatures, then the control routine proceeds to step S7 and the thermoelectric device 14 is turned off.

It should be understood from the above description of the vehicle air conditioning system 12 that the operations of the controller 34 are easily modified. For example, if the temperature sensor 48 is omitted from the thermoelectric device 14, then step S5 can be deleted from the operational flowchart depicted in FIG. 6. Such temperature protection of the thermoelectric device 14 is not necessary in all applications of the present invention. Therefore, the temperatures sensor 48 is an optional feature of the vehicle air conditioning system 12 of the present invention.

It should also be understood from the above description that the controller 34 can operate the thermoelectric device 14 by detecting temperature at either one or both of the temperature sensors 38 and 56. Use of both of the temperature sensors 38 and 56 is not required, although preferably at least one or the other of the temperature sensors 38 or 56 is used in the basic control of the thermoelectric device 14 by the controller 34.

The controller 34 preferably includes a microcomputer with a control program that controls the thermoelectric device 14. The controller 34 can also include other conventional components such as an input interface circuit, an output interface circuit, and storage devices such as a ROM (Read Only Memory) device and a RAM (Random Access Memory) device. The microcomputer of the controller 34 is programmed to control the thermoelectric device 14. It will be apparent to those skilled in the art from this disclosure that the precise structure and algorithms for the controller 34 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Second Embodiment

Figure 7:
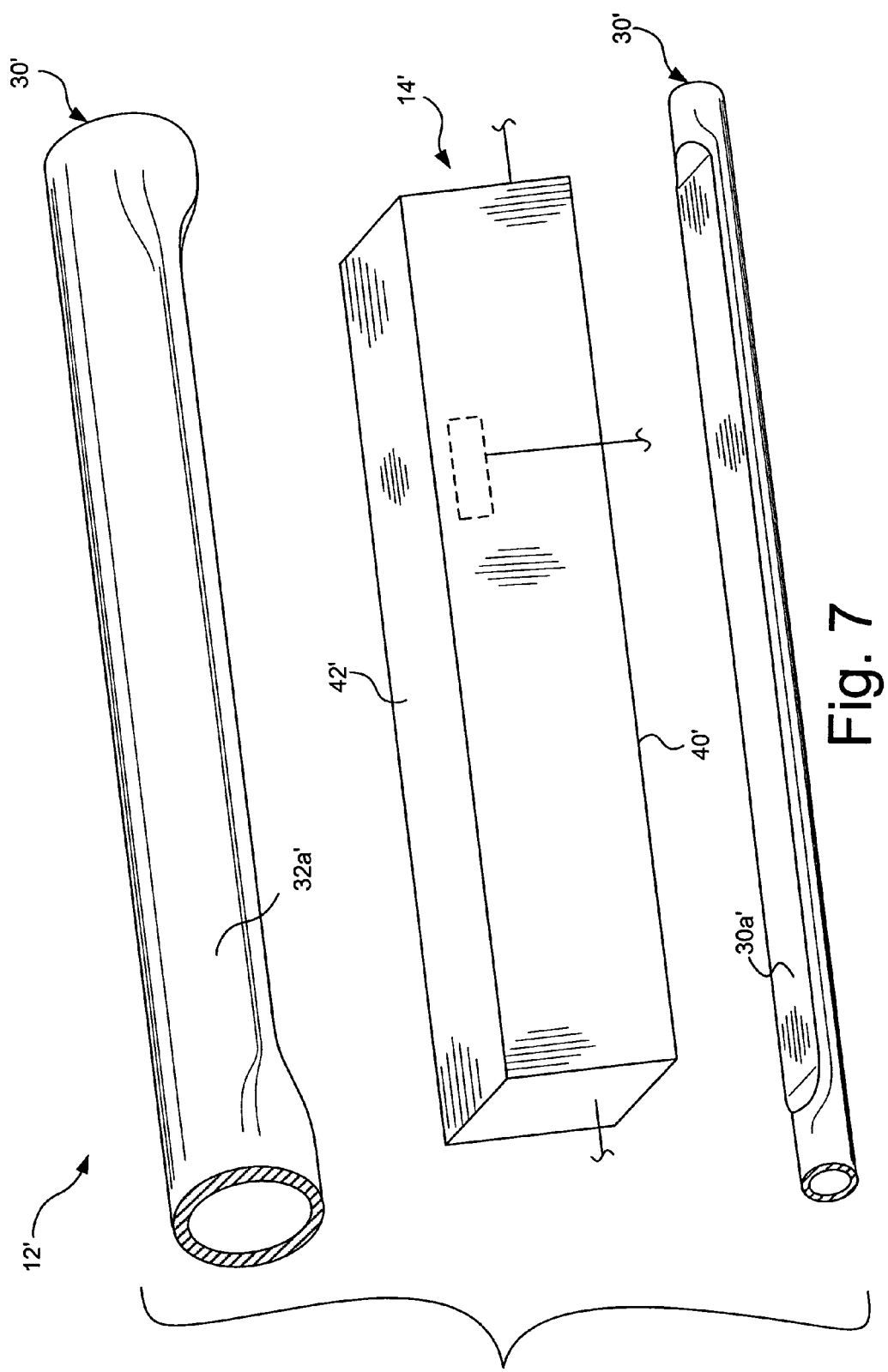
FIG. 7 is enlarged, exploded perspective view, similar to FIG. 5, of a modified portion of the vehicle air conditioning system in accordance with a second embodiment of the present invention.

Referring now to FIG. 7, a portion of a vehicle air conditioning system 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, all the portions of the vehicle air conditioning system 12' are generally the same as the vehicle air conditioning system 12 of the first embodiment, except that the second high pressure tube 30, the low pressure tube 32 and the thermoelectric device 14 are replaced in the second embodiment with a second high pressure tube 30', a low pressure tube 32' and a thermoelectric device 14'. Thus, the second high pressure tube 30', the low pressure tube 32' and the thermoelectric device 14' are used with the other parts of the first embodiment that were discussed above.

The second high pressure tube 30' includes a flat portion 30a' and the low pressure tube 32' includes a flat portion 32a'. Further, the thermoelectric device 14' has a generally flat heat absorbing side 40' and a generally flat heat dissipating side 42'. As indicated in FIG. 7, the heat absorbing side 40' is configured to contact and transfer heat from the flat portion 30a' of the second high pressure tube 30' and the heat dissipating side 42' is configured to contact and transfer heat to the flat portion 32a' of the low pressure heat tube 32'. The second high pressure tube 30', the low pressure tube 32' and a thermoelectric device 14' can be fixed to one another by any of a variety of bonding methods, such a mechanical fasteners, adhesives or welding techniques. Other than the second high pressure tube 30', the low pressure tube 32' and the thermoelectric device 14', the basic elements of the second embodiment are generally the same as the corresponding elements of the first embodiment.

Third Embodiment

Figure 8:
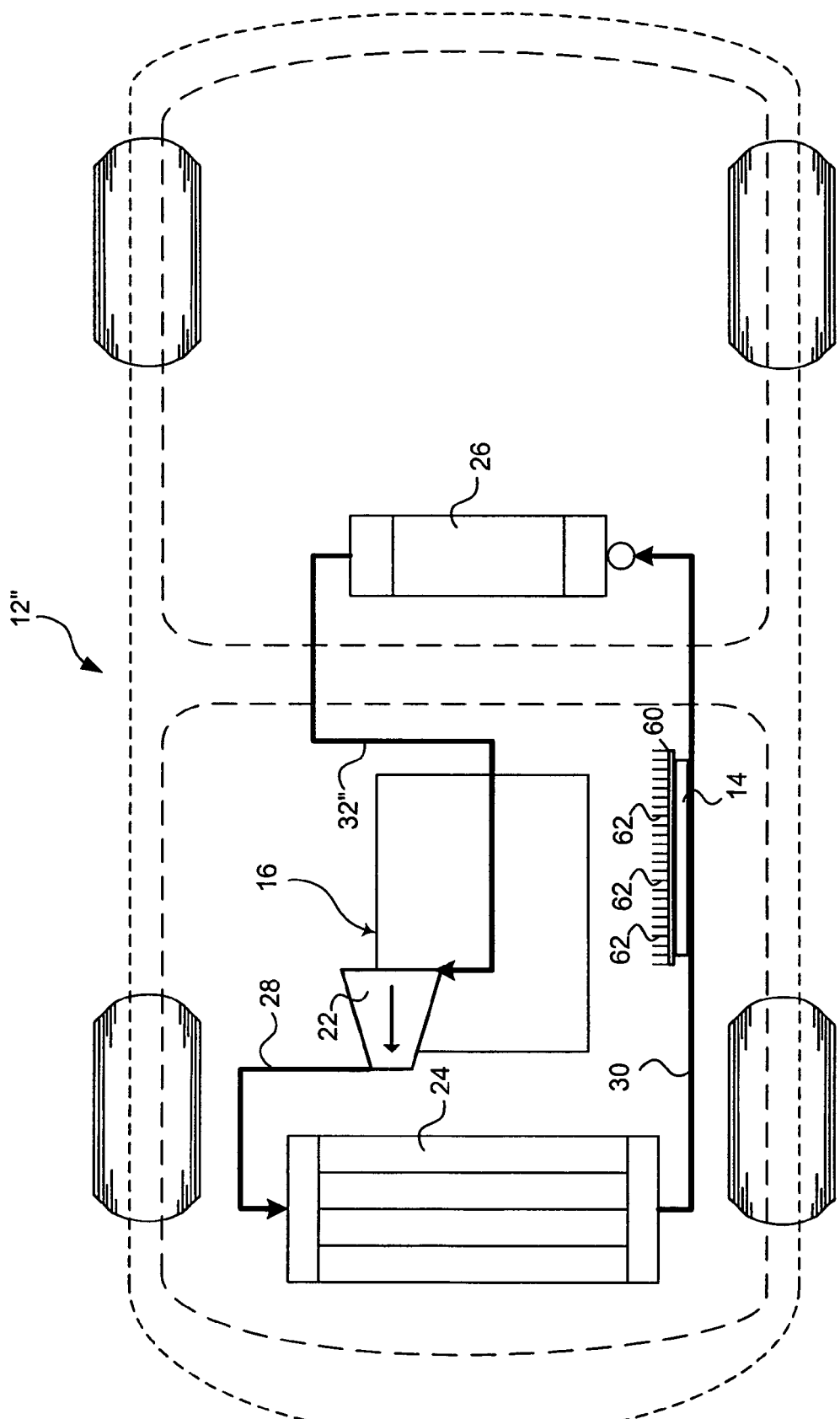
FIG. 8 is a simplified, schematic top plan view of the vehicle and the vehicle air conditioning system showing the thermoelectric device and a heat dissipation member in accordance with a third embodiment of the present invention.

Referring now to FIG. 8, a portion of a vehicle air conditioning system 12" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The third embodiment includes the thermoelectric device 14, the compressor 22, the condenser 24, the evaporator 26, the first high pressure tube 28, the second high pressure tube 30 and the controller 34 (not shown in FIG. 8). These components are generally the same or identical to the similarly named components of the first embodiment. However, in the third embodiment, the low pressure tube 32 is replaced with a low pressure tube 32". The low pressure tube 32" is spaced apart from the thermoelectric device 14. Further, the heat sink for the thermoelectric device 14 in the third embodiment is a heat dissipation member 60 that includes elongated heat dissipating fins 62. The fins 62 can be formed in any of a variety of heat releasing configurations in order to dissipate heat moved by the thermoelectric device 14 from the second high pressure tube 30 to the heat sink. Other than the low pressure tube 32" and the heat dissipation member 60 with its fins 62, the basic elements of the third embodiment are generally the same as the corresponding elements of the first embodiment.

Fourth Embodiment

Figure 9:
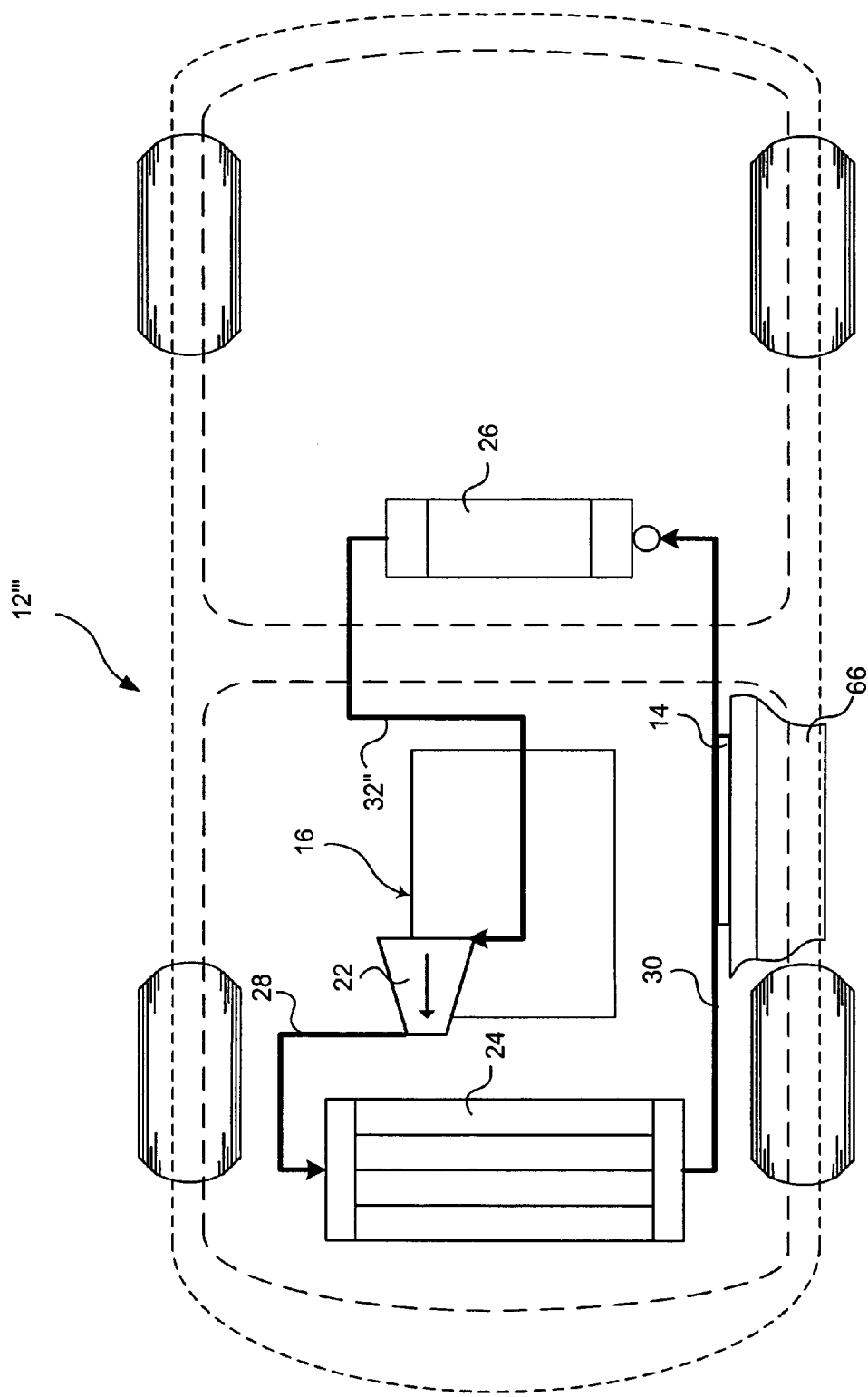
FIG. 9 is a simplified, schematic top plan view of the vehicle and the vehicle air conditioning system showing the thermoelectric device in contact with a portion of the vehicle body for heat dissipation in accordance with a fourth embodiment of the present invention.

Referring now to FIG. 9, a portion of a vehicle air conditioning system 12''' in accordance with a fourth embodiment will now be explained. In view of the similarity between the prior embodiments and this fourth embodiment, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

The fourth embodiment includes the thermoelectric device 14, the compressor 22, the condenser 24, the evaporator 26, the first high pressure tube 28, the second high pressure tube 30 and the controller 34 (not shown in FIG. 8). These components are generally the same or identical to the similarly named components of the first embodiment. However, in the fourth embodiment, the low pressure tube 32" of the third embodiment is employed and the heat sink for the thermoelectric device 14 includes at least a portion of a vehicle body member 66. The vehicle body member 66 can be a conventional portion of the vehicle 10, such as a body panel that is part of uni-body construction within the engine compartment 18 or other structural frame element of the vehicle 10. The main requirement of the portion of a vehicle body member 66 is a heat absorbing and dissipating capability. Other than the low pressure tube 32" and the use of the vehicle body member 66 as the heat sink, the basic elements of the fourth embodiment are generally the same as the corresponding elements of the first embodiment.

The various portions of the vehicle 10 are conventional components that are well known in the art. Since vehicles are well known in the art, these structures will not be discussed or illustrated in detail herein. Rather, it will be apparent to those skilled in the art from this disclosure that the components can be any type of structure and/or programming that can be used to carry out the present invention.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air conditioning system comprising:
   a compressor configured to receive a refrigerant and compress the refrigerant to a compressed state;
   a condenser in fluid communication with the compressor to receive the refrigerant in the compressed state via a high pressure tube;
   an evaporator in fluid communication between the condenser and the compressor to receive the refrigerant from the condenser and convey the refrigerant to the compressor via a low pressure tube; and
   a thermoelectric device operatively arranged relative to at least a portion of the high pressure tube to remove heat from the high pressure tube, the thermoelectric device contacting at least a portion of the low pressure tube to dissipate heat from the thermoelectric device to the portion of the low pressure tube.

2. The vehicle air conditioning system as set forth in claim 1, further comprising
   a controller operatively connected to the thermoelectric device to turn the thermoelectric device on and off in response to a predetermined operating condition of the vehicle air conditioning system.

3. A vehicle air conditioning system comprising:
   a compressor configured to receive a refrigerant and compress the refrigerant to a compressed state;
   a condenser in fluid communication with the compressor to receive the refrigerant in the compressed state via a high pressure tube;
   an evaporator in fluid communication between the condenser and the compressor to receive the refrigerant from the condenser and convey the refrigerant to the compressor via a low pressure tube;
   a thermoelectric device operatively arranged relative to at least a portion of the high pressure tube to remove heat from the high pressure tube; and
   a controller operatively connected to the thermoelectric device to turn the thermoelectric device on and off in response to a predetermined operating condition of the vehicle air conditioning system, the controller being operatively connected to a temperature sensor that is configured and arranged to sense temperature of the evaporator as the predetermined operating condition.

4. The vehicle air conditioning system as set forth in claim 3, wherein
   the controller is configured to turn the thermoelectric device on in response to detection by the temperature sensor of the evaporator operating above a threshold temperature.

5. The vehicle air conditioning system as set forth in claim 3, wherein
   the controller is operatively connected to a temperature sensor that is configured and arranged to detect ambient temperature outside a vehicle equipped with the vehicle air conditioning system as the predetermined operating condition.

6. The vehicle air conditioning system as set forth in claim 5, wherein
   the controller is configured to turn the thermoelectric device on in response to detection by the temperature sensor of the ambient temperature exceeding a threshold temperature when the vehicle air conditioning system is operating.

7. The vehicle air conditioning system as set forth in claim 3, wherein
   the controller is operatively connected to a temperature sensor that is configured and arranged to detect temperature of the thermoelectric device, and
   the controller configured to turn the thermoelectric device off in response to detection by the temperature sensor of the thermoelectric device exceeding a threshold temperature when the vehicle air conditioning system is operating.

8. The vehicle air conditioning system as set forth in claim 7, wherein
the controller is operatively connected to a temperature sensor that is configured and arranged to sense temperature of the evaporator as the predetermined operating condition.

9. The vehicle air conditioning system as set forth in claim 8, wherein
the controller is configured to turn the thermoelectric device on in response to detection by the temperature sensor of the evaporator operating above a threshold temperature.

10. The vehicle air conditioning system as set forth in claim 7, wherein
the controller is operatively connected to a temperature sensor that is configured and arranged to detect ambient temperature outside a vehicle equipped with the vehicle air conditioning system as the predetermined operating condition.

11. The vehicle air conditioning system as set forth in claim 10, wherein
the controller is configured to turn the thermoelectric device on in response to detection by the temperature sensor of the ambient temperature exceeding a threshold temperature when the vehicle air conditioning system is operating.

12. The vehicle air conditioning system as set forth in claim 3, wherein
the thermoelectric device contacts at least a portion of the low pressure tube to dissipate heat from the thermoelectric device to the portion of the low pressure tube.

13. The vehicle air conditioning system as set forth in claim 3, wherein
the thermoelectric device contacts at least a portion of a vehicle body member to dissipate heat from the thermoelectric device to the vehicle body member.

14. The vehicle air conditioning system as set forth in claim 3, wherein
the thermoelectric device has a heat sink that is arranged formed by to dissipate heat from the thermoelectric device to the heat sink.

15. The vehicle air conditioning system as set forth in claim 14, wherein
the heat sink has a heat dissipation member that includes cooling fins.

* * * * *